(12) United States Patent
Aoki (10) Patent No.: US 11,502,337 B2
(45) Date of Patent: Nov. 15, 2022

(54) CYLINDRICAL SECONDARY BATTERY

(71) Applicant: Panasonic Intellectual Property Management Co., Ltd., Osaka (JP)

(72) Inventor: Seiichi Aoki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 216 days.

(21) Appl. No.: 16/767,544

(22) PCT Filed: Oct. 31, 2018

(86) PCT No.: PCT/JP2018/040427
§ 371 (c)(1),
(2) Date: May 27, 2020

(87) PCT Pub. No.: WO2019/107049
PCT Pub. Date: Jun. 6, 2019

(65) Prior Publication Data
US 2021/0159546 A1    May 27, 2021

(30) Foreign Application Priority Data
Nov. 30, 2017  (JP) .............................. JP2017-231203

(51) Int. Cl.
*H01M 4/13* (2010.01)
*H01M 50/107* (2021.01)
(Continued)

(52) U.S. Cl.
CPC ......... *H01M 10/0587* (2013.01); *H01M 4/13* (2013.01); *H01M 10/0422* (2013.01);
(Continued)

(58) Field of Classification Search
CPC ...... H01M 4/13; H01M 4/23; H01M 10/0587; H01M 10/0525; H01M 50/107; H01M 50/186
See application file for complete search history.

(56) References Cited

U.S. PATENT DOCUMENTS 5,958,620 A    9/1999  Nagaura
6,013,393 A    1/2000  Taniuchi et al.
(Continued)

FOREIGN PATENT DOCUMENTS

JP    H07-105935 A    4/1995
JP    H09-73917 A     3/1997
(Continued)

OTHER PUBLICATIONS

Machine Translation of: JP 2000/195556, Oohana et al., Jul. 14, 2000.*
(Continued)

*Primary Examiner* — Kenneth J Douyette
(74) *Attorney, Agent, or Firm* — McDermott Will & Emery LLP (57) ABSTRACT

A cylindrical secondary battery includes a bottomed cylindrical battery case having an opening, an electrode group, an electrolyte solution, and a sealing member blocking the opening of the battery case. The electrode group includes a positive electrode, a negative electrode, and a separator. The negative electrode includes a negative electrode current collector and a negative electrode mix layer placed on at least one principal surface of the negative electrode current collector. The negative electrode mix layer includes a non-facing region not facing the positive electrode mix layer. The density of the negative electrode mix layer is 1.25 g/cm³ to 1.43 g/cm³, the ratio of the entire length of the non-facing region to the entire length of the negative electrode mix layer
(Continued)

is 0.09 or more, and the inside diameter of a hollow section of the electrode group is 2.0 mm or less.

10 Claims, 4 Drawing Sheets

(51) Int. Cl.
*H01M 10/0587* (2010.01)
*H01M 50/186* (2021.01)
*H01M 10/04* (2006.01)
*H01M 10/0525* (2010.01)
*H01M 10/056* (2010.01)
*H01M 4/02* (2006.01)

(52) U.S. Cl.
CPC ..... *H01M 10/056* (2013.01); *H01M 10/0525* (2013.01); *H01M 50/107* (2021.01); *H01M 50/186* (2021.01); H01M 2004/021 (2013.01); H01M 2220/30 (2013.01)

(56) References Cited

U.S. PATENT DOCUMENTS

| | | | | |
|---|---|---|---|---|
| 6,042,965 | A * | 3/2000 | Nestler | H01M 50/411 429/129 |
| 2006/0078796 | A1 | 4/2006 | Ozaki et al. | |
| 2011/0027636 | A1* | 2/2011 | Lee | H01M 50/46 429/94 |
| 2011/0097623 | A1* | 4/2011 | Marinis, Jr. | H01M 50/172 29/623.2 |
| 2014/0141303 | A1* | 5/2014 | Matsushita | H01M 4/366 429/94 |
| 2014/0234682 | A1* | 8/2014 | Kwon | H01M 10/0525 429/246 |
| 2015/0357679 | A1 | 12/2015 | Sano et al. | |
| 2016/0043358 | A1* | 2/2016 | Joo | H01M 4/13 429/94 |

FOREIGN PATENT DOCUMENTS

| | | |
|---|---|---|
| JP | 10-172523 A | 6/1998 |
| JP | 2000-3722 A | 1/2000 |
| JP | 2000-195556 A | 7/2000 |
| JP | 2001-40410 A | 2/2001 |
| JP | 2003-157830 A | 5/2003 |
| JP | 2006-140138 A | 6/2006 |
| JP | 2013-51125 A | 3/2013 |
| JP | 2013-254561 A | 12/2013 |
| WO | 2014/132660 A1 | 9/2014 |
| WO | 2017/047353 A1 | 3/2017 |

OTHER PUBLICATIONS

Machine Translation of: JP 2000/003722, Nishida, Jan. 7, 2000.*
International Search Report issued in corresponding International Patent Application No. PCT/JP2018/040427, dated Feb. 5, 2019, with English translation.

* cited by examiner

CYLINDRICAL SECONDARY BATTERY

CROSS-REFERENCE OF RELATED APPLICATIONS

This application is the U.S. National Phase under 35 U.S.C. § 371 of International Patent Application No. PCT/JP2018/040427, filed on Oct. 31, 2018, which in turn claims the benefit of Japanese Application No. 2017-231203, filed on Nov. 30, 2017, the entire disclosures of which Applications are incorporated by reference herein.

TECHNICAL FIELD

The present invention relates to a cylindrical secondary battery including a wound electrode group.

BACKGROUND ART

Applications of devices using batteries are increasing. In particular, lithium ion secondary batteries have light weight, high capacity, and high power and therefore are widely used as power supplies for driving notebook personal computers, mobile phones, and other portable electronic devices. In such applications, high-capacity lithium ion secondary batteries having a diameter of about 14 mm to 18 mm and a height of about 40 mm to 65 mm have hitherto been widely used.

In a high-capacity lithium ion secondary battery, a wound electrode group in which a positive electrode and a negative electrode are wound with a separator therebetween generally is used (Patent Literature 1). The wound electrode group is generally formed in such a manner that the positive electrode, the negative electrode, and the separator placed therebetween are wound using a core and the core is removed. Removing the core allows a hollow section to be formed in a central section of the electrode group.

Patent Literature 2 describes a nonaqueous electrolyte secondary battery which contains a negative electrode mix with a density of 1.5 g/cc or less and which therefore has enhanced high-load discharge characteristics.

Patent Literature 3 describes a nonaqueous electrolyte secondary battery in which the thickness A of a negative electrode mix layer and the thickness B of a positive electrode mix layer are within the range of 80 μm to 250 μm, A/B is set such that 0.4<A/B<1.0, and the sum A+B of the thickness of the negative electrode mix layer and the thickness of the positive electrode mix layer is within the range of 230 μm to 450 μm and which therefore has enhanced low-temperature load characteristics.

CITATION LIST

Patent Literatures

PTL 1: International Publication No. 2014/132660
PTL 2: Japanese Published Unexamined Patent Application No. 7-105935
PTL 3: Japanese Published Unexamined Patent Application No. 2001-40410

SUMMARY OF INVENTION

In a high-capacity lithium ion secondary battery, a large amount of an electrolyte solution is used in a charge-discharge reaction. Therefore, the degradation and uneven distribution of the electrolyte solution proceed while charge and discharge are repeated, so that the electrolyte solution is likely to become locally short. In a cylindrical secondary battery including a wound electrode group with a general size, the volume of a hollow section is large and therefore a certain amount of an electrolyte solution can be ensured using the hollow section.

On the other hand, in recent years, as portable electronic devices have further reduced in size and have increased in functionality, demands for high-capacity and/or high-power compact power supplies are increasing. A small-sized cylindrical secondary battery (for example, a pin-type battery) has been proposed as such a compact power supply. The innermost peripheral diameter of a plate group of such a compact battery is 2.0 mm or less and the volume of a hollow section is small in comparison with the innermost peripheral diameter (3 mm to 5 mm) of a plate group of a battery with a general size. Therefore, the amount of an electrolyte solution that can be stored is small.

In a compact battery having a hollow section with a small volume, the return of an electrolyte solution (a phenomenon in which an electrolyte solution squeezed out of an electrode plate by the expansion of a negative electrode during charge returns to the electrode plate again) is likely to be insufficient. In particular, in quick charge, the electrolyte solution is likely to be depleted in comparison with a battery with a large diameter, heterogeneous reactions are likely to occur, and deterioration is severe.

An aspect of the present invention relates to a cylindrical secondary battery including a bottomed cylindrical battery case having an opening, an electrode group housed in the battery case, an electrolyte solution housed in the battery case, and a sealing member blocking the opening of the battery case.

The electrode group includes a positive electrode, a negative electrode, and a separator placed between the positive electrode and the negative electrode and is formed in such a manner that the positive electrode and the negative electrode are wound with the separator therebetween. The positive electrode includes a positive electrode current collector and a positive electrode mix layer placed on at least one principal surface of the positive electrode current collector. The negative electrode includes a negative electrode current collector and a negative electrode mix layer placed on at least one principal surface of the negative electrode current collector.

The negative electrode mix layer includes a non-facing region not facing the positive electrode mix layer.

The density of the negative electrode mix layer is 1.25 g/cm³ to 1.43 g/cm³.

The ratio of the entire length of the non-facing region to the entire length of the negative electrode mix layer is 0.09 or more.

The inside diameter of a hollow section of the electrode group is 2.0 mm or less.

According to the present invention, a compact cylindrical battery with excellent cycle characteristics in charge and discharge associated with quick charge can be provided.

DESCRIPTION OF EMBODIMENTS

A cylindrical secondary battery according to this embodiment includes a bottomed cylindrical battery case having an opening, an electrode group housed in the battery case, an electrolyte solution housed in the battery case, and a sealing member blocking the opening of the battery case. The electrode group includes a positive electrode, a negative electrode, and a separator placed between the positive electrode and the negative electrode. The positive electrode and the negative electrode are in such a state that the positive electrode and the negative electrode are wound with the separator therebetween. The positive electrode includes a positive electrode current collector and a positive electrode mix layer placed on at least one principal surface of the positive electrode current collector. The negative electrode includes a negative electrode current collector and a negative electrode mix layer placed on at least one principal surface of the negative electrode current collector. The negative electrode mix layer includes a non-facing region not facing the positive electrode mix layer. The density of the negative electrode mix layer is 1.25 g/cm$^3$ to 1.43 g/cm$^3$. The ratio of the entire length of the non-facing region to the entire length of the negative electrode mix layer is 0.09 or more. The inside diameter of a hollow section of the electrode group is 2.0 mm or less.

The electrode group is formed in such a manner that the positive electrode and the negative electrode are wound with the separate therebetween and a core is removed. Removing the core allows a space to be formed in a central section of the electrode group. This space is referred to as a hollow section. The separator or negative electrode held with the core upon winding remains in a central portion of the hollow section in some cases. In this embodiment, the hollow section is conceived such that portions of the separator and the negative electrode that remain in the central portion in such a state that a gap is present on the outer periphery side are disregarded.

The inside diameter of the hollow section means the diameter. A case where the shape of the hollow section is not strictly circular is conceivable. In this case, the inside diameter of the hollow section means the diameter of a circle corresponding to the innermost peripheral surface of the electrode group in a cross section perpendicular to a winding axis direction (a circle having the same area as the area of the hollow section in a cross section).

In the electrode group, the positive electrode mix layer and the negative electrode mix layer usually face each other with the separator therebetween. However, in the non-facing region, the negative electrode mix layer does not face the positive electrode mix layer with the separator therebetween.

Therefore, in the non-facing region, the electrolyte solution is likely to be ensured in the negative electrode mix layer and the depletion of the electrolyte solution can be reduced by increasing the proportion of the non-facing region. This suppresses deterioration even in quick charge.

Even in a case where charge and discharge associated with quick charge are repeated, good cycle characteristics are obtained.

Quick charge is charge performed at a current of, for example, more than 1 C (high rate). The value of current is not particularly limited. According to this embodiment, cycle characteristics are enhanced even in a case where charge is performed at, for example, 3 C or more. One coulomb is the value of current at which the charge of the capacity corresponding to a nominal capacity is completed in one hour when a secondary battery is charged at a constant current. Likewise, 3 C is the value of current at which the charge of the capacity corresponding to a nominal capacity is completed in one-third hour (20 minutes) when a secondary battery is charged at a constant current. Incidentally, discharge may be performed at high rate.

The density of the negative electrode mix layer is preferably 1.43 g/cm$^3$ or less, which ensures an influx route of the electrolyte solution between and in the negative electrode mix layer to enable liquid returning properties to be enhanced. On the other hand, from the viewpoint of reducing the delamination of the negative electrode mix layer from the negative electrode current collector, the density of the negative electrode mix layer is preferably 1.25 g/cm$^3$ or more. This is because the adhesion between the negative electrode current collector and the negative electrode mix layer can be maintained and the delamination of the negative electrode mix layer can be reduced in an inner peripheral section with a large curvature.

The entire length L1 of the non-facing region can be calculated in the form of the difference (L2−L3) obtained by subtracting the entire length of the positive electrode mix layer from the entire length of the negative electrode mix layer, where L2 is the entire length of the negative electrode mix layer and L3 is the entire length of the positive electrode mix layer. The entire length L1 of the non-facing region is preferably 0.09 times or more the entire length L2 of the negative electrode mix layer (L1/L2≥0.09). Increasing the proportion of the non-facing region to the negative electrode mix layer to 0.09 or more enables the electrolyte solution to be sufficiently ensured in the negative electrode mix layer of the non-facing region; hence, deterioration due to the depletion of the electrolyte solution is suppressed.

The length of the negative electrode mix layer (positive electrode mix layer) means the length of the unwound negative electrode mix layer (positive electrode mix layer) in a winding direction. The entire length of the negative electrode mix layer (positive electrode mix layer) means the sum of the lengths of negative electrode mix layers (positive electrode mix layers) formed on surfaces in a case where the negative electrode mix layers (positive electrode mix layers) are formed on both surfaces of the negative electrode current collector (positive electrode current collector).

The non-facing region may be placed in an arbitrary place in the electrode group and is preferably placed such that the ratio of the entire length $L1_{in}$ of an inner peripheral non-facing region placed in the inner peripheral section to the entire length L2 of the negative electrode mix layer is large. This allows the electrolyte solution to be readily held in the inner peripheral section, which is likely to be short of the electrolyte solution, and also allows good cycle characteristics to be obtained even in a case where charge and discharge associated with quick charge are repeated. Incidentally, in the case where the negative electrode mix layers are formed on both surfaces of the negative electrode current collector, the inner peripheral non-facing region includes a non-facing region located on the inner periphery side rather than the negative electrode current collector and a non-facing region located on the outer periphery side rather than the negative electrode current collector. The entire length $L1_{in}$ of the inner peripheral non-facing region means the sum of the lengths of the non-facing regions located on the inner periphery side and the outer periphery side. In particular, $L1_{in}/L2 \geq 0.04$ preferably holds.

From the viewpoint of ensuring the amount of the electrolyte solution per the amount of a mix to suppress drying-up, the sum of the thickness of the positive electrode mix layer and the thickness of the negative electrode mix layer is preferably 100 μm or less. Incidentally, the thickness of the positive electrode mix layer (negative electrode mix layer) means the thickness of a positive electrode mix layer (negative electrode mix layer) on one surface in a case where the positive electrode mix layers (negative electrode mix layers) are formed on both surfaces of the positive electrode current collector (negative electrode current collector).

In a region in which the positive electrode mix layer and the negative electrode mix layer face each other with the separator therebetween, the ratio of the thickness of the positive electrode mix layer to the thickness of the negative electrode mix layer is preferably from 0.6 to 0.9. When the thickness of the positive electrode mix layer is large and the amount of a positive electrode mix is relatively large, the electrolyte solution is absorbed on the positive electrode side, the electrolyte solution on the negative electrode side is likely to be short, and the negative electrode mix layer is likely to be dried up particularly in quick charge. However, when the thickness of the positive electrode mix layer is small and the amount of a positive electrode active material is relatively small, the battery capacity is low. From the viewpoint of ensuring quick charge characteristics and the viewpoint of increasing the capacity of the battery, the thickness of the positive electrode mix layer that is divided by the thickness of the negative electrode mix layer is preferably 0.6 to 0.9.

In accordance with the cylindrical secondary battery according to this embodiment, in a compact battery in which the inside diameter of a hollow section of an electrode group is 2.0 mm or less, deterioration in the case of repeating charge and discharge associated with quick charge is suppressed and good cycle characteristics are obtained. However, the inside diameter of the hollow section of the electrode group may be 2.0 mm or less regardless of the size (battery diameter) of the cylindrical secondary battery. In this case, the winding length of the positive electrode and the negative electrode can be increased and therefore higher capacity can be obtained.

The negative electrode current collector is preferably exposed at the outermost periphery of the electrode group. Since the outermost periphery is not provided with the negative electrode mix layer, the electrolyte solution is likely to reach the inner peripheral section. Furthermore, the outermost periphery is preferably provided with no separator. Since an outer peripheral section has nothing to absorb any liquid, the electrolyte solution is more likely to reach the inner peripheral section.

Components of the cylindrical secondary battery are described below in detail. In this embodiment, a cylindrical lithium ion secondary battery is described as an example. The present invention is not limited to the cylindrical lithium ion secondary battery.

(Positive Electrode)

The positive electrode, which is included in the electrode group, includes the positive electrode current collector and the positive electrode mix layer, which is placed on at least one principal surface of the positive electrode current collector.

The positive electrode current collector may be metal foil such as aluminum foil and/or aluminum alloy foil. The thickness of the positive electrode current collector is not particularly limited and is preferably 10 μm to 50 μm from the viewpoint of the reduction in size of the battery and the viewpoint of the strength of the positive electrode current collector.

The positive electrode mix layer may be formed on one surface of the positive electrode current collector or may be formed on both surfaces thereof from the viewpoint of an increase in capacity.

As the thickness of the positive electrode mix layer (the positive electrode mix layer formed on one surface of the positive electrode current collector) is larger, an electrode plate in the inner peripheral section, which has a large curvature, is more likely to be cracked, although the battery capacity can be ensured. From the viewpoint that high capacity is obtained and the cracking of the electrode plate in the inner peripheral section is reduced, the thickness of the positive electrode mix layer is preferably 20 μm to 80 μm and more preferably 25 μm to 60 μm.

The positive electrode mix layer contains the positive electrode active material. The positive electrode active material is not particularly limited and may be material usable in lithium ion secondary batteries. Examples of the positive electrode active material include, for example, lithium transition metal oxides such as lithium cobaltate ($LiCoO_2$), lithium nickelate ($LiNiO_2$), and lithium manganate ($LiMn_2O_4$) and lithium composite oxides obtained by replacing a portion of Co, Ni, or Mn in these compounds with another element (a transition metal element, a representative element, and/or the like). From the viewpoint of the reduction in size of the battery and the viewpoint of an increase in energy density, particular examples of the lithium composite oxides include a composite oxide represented by the general formula $Li_{x1}Ni_{y1}M^a_{1-y1}O_2$ (1) and/or a composite oxide represented by the general formula $Li_{x2}Ni_{y2}Co_{z1}M^b_{1-y2-z1}O_2$ (2).

In Formula (1), element $M^a$ is, for example, at least one selected from the group consisting of Na, Mg, Sc, Y, Mn, Fe, Co, Cu, Zn, Al, Cr, Pb, Sb, and B and x1 and y1 satisfy, for example, $0<x1\leq1.2$ and $0.5<y1\leq1.0$, respectively. Incidentally, x1 is a value that varies depending on charge and discharge.

In Formula (2), element $M^b$ is, for example, at least one selected from the group consisting of Mg, Ba, Al, Ti, Sr, Ca, V, Fe, Cu, Bi, Y, Zr, Mo, Tc, Ru, Ta, and W and x2, y2, and z1 satisfy, for example, $0<x2\leq1.2$ (preferably $0.9\leq x2\leq1.2$), $0.3\leq y2\leq0.9$, and $0.05\leq z1\leq0.5$, respectively. Incidentally, x2 is a value that varies depending on charge and discharge. In Formula (2), $0.01\leq1-y2-z1\leq0.3$ may hold.

Positive electrode active materials may be used alone or in combination.

The positive electrode mix layer may contain a binding agent and/or a conductive agent as required. The binding agent is not particularly limited and may be one for use in lithium ion secondary batteries. Particular examples of the binding agent include fluorocarbon resins such as polyvinylidene fluoride (PVdF), rubbery polymers such as styrene-butadiene rubber and fluorinated rubber, and/or polyacrylic acid. The amount of the binding agent in the positive electrode mix layer is, for example, one part by mass to five parts by mass with respect to 100 parts by mass of the positive electrode active material.

The conductive agent is not particularly limited and may be one for use in lithium ion secondary batteries. Particular examples of the conductive agent include carbonaceous materials such as graphite, carbon black, and carbon fibers; metal fibers; and/or conductive organic materials. In a case where the conductive agent is used, the amount of the conductive agent in the positive electrode mix layer is, for example, 0.5 parts by mass to five parts by mass with respect to 100 parts by mass of the positive electrode active material.

The positive electrode can be formed in such a manner that positive electrode slurry containing the positive electrode active material and a dispersion medium is applied to a surface of the positive electrode current collector, is dried, and is compressed in a thickness direction. The binding agent and/or the conductive agent may be added to the positive electrode slurry. As the dispersion medium, water, an organic solvent such as N-methyl-2-pyrrolidone (NMP), and a solvent mixture of these can be used.

(Negative Electrode)

The negative electrode includes the negative electrode current collector and the negative electrode mix layer, which is placed on at least one of principal surfaces of the negative electrode current collector.

The negative electrode current collector may be metal foil such as copper foil and/or copper alloy foil. Since Cu has low resistance, high power is likely to be obtained using a negative electrode current collector containing copper.

The negative electrode mix layer may be formed only on one surface of the negative electrode current collector or may be formed on both surfaces thereof from the viewpoint of an increase in capacity. In the wound electrode group, at the winding start and/or the winding end, the negative electrode mix layer may be formed only on one surface of the negative electrode current collector or regions free from the negative electrode mix layer may be formed on both corresponding surfaces of the negative electrode current collector.

As the thickness of the negative electrode mix layer (the negative electrode mix layer formed on one surface of the negative electrode current collector) is larger, the battery capacity is more capable of being ensured and, however, the penetration of the electrolyte solution into the mix layer in the depth direction thereof is insufficient and deterioration is likely to occur during quick charge. From the viewpoint that the mix layer is impregnated with the electrolyte solution and high capacity is obtained, the thickness of the negative electrode mix layer is preferably 20 μm to 80 μm and more preferably 35 μm to 70 μm.

As the sum of the thickness of the positive electrode mix layer and the thickness of the negative electrode mix layer is larger, the amounts of mixes with respect to the battery internal volume are large. Thus, the electrolyte solution per the amounts of the mixes is short and drying-up is likely to occur. From the viewpoint that the amount of the electrolyte solution per the amounts of the mixes is ensured and the positive electrode mix layer and the negative electrode mix layer are sufficiently impregnated with the electrolyte solution, the sum of the thickness of the positive electrode mix layer and the thickness of the negative electrode mix layer is preferably 100 μm or less.

The negative electrode mix layer contains a negative electrode active material. The negative electrode active material is not particularly limited and may be a carbon material usable in lithium ion secondary batteries. Examples of the negative electrode active material include carbonaceous materials, such as graphite materials (natural graphite, synthetic graphite, and the like) and amorphous carbon materials, capable of storing and releasing lithium ions.

The negative electrode mix layer may contain a binding agent and/or a thickening agent as required.

The binding agent is not particularly limited and may be a binding agent for use in lithium ion secondary batteries. For example, the same compound as the binding agent that may be contained in the positive electrode mix layer can be cited. These binding agents can include material (for example, PVdF) having swelling properties for the electrolyte solution. Therefore, the negative electrode mix layer itself can hold the electrolyte solution in some cases and the drying-up of the negative electrode can be somewhat relieved. However, according to this embodiment, a large amount of the electrolyte solution can be held particularly on the inner peripheral section of the electrode group and therefore cycle characteristics are enhanced even in a case where charge and discharge associated with quick charge are repeated.

The thickening agent is not particularly limited and may be a thickening agent for use in lithium ion secondary battery. Examples of the thickening agent include cellulose ethers such as carboxymethylcellulose (CMC).

The negative electrode can be formed similarly to the positive electrode. Negative electrode slurry contains the negative electrode active material and a dispersion medium and may further contain the binding agent and/or the thickening agent as required. The dispersion medium can be appropriately selected from those exemplified for the positive electrode.

(Separator)

The separator used is one having high ion permeability, appropriate mechanical strength, and insulating properties. The separator used is not particularly limited and may be a separator for use in lithium ion secondary batteries. Examples of the separator include microporous membranes made of resin, woven fabrics, and/or nonwoven fabrics. As the resin, polyolefin resins such as polypropylene and polyethylene, polyamide resins, and/or polyimide resins can be exemplified. The separator may be a microporous membrane containing a polyolefin resin in terms of having excellent durability and a so-called shutdown function that pores are closed when being heated to a certain temperature.

The thickness of the separator is not particularly limited and may be selected from the range of, for example, 5 μm to 300 μm. The thickness of the separator may be 5 μm to 40 μm or 5 μm to 30 μm.

(Wound Electrode Group)

The wound electrode group is formed in such a manner that the positive electrode, the negative electrode, and the separator placed therebetween are wound using the core, followed by removing the core. In this operation, a non-facing region in which the negative electrode mix layer does not face the positive electrode mix layer can be formed in a desired region of the electrode group. Using such a core allows a cylindrical electrode group to be obtained. Incidentally, the cylindrical electrode group includes cylinder-like shapes such as a shape in which a cylinder is partly bent and a shape in which a cylinder is slightly crushed in a diameter direction thereof.

(Electrolyte Solution)

The electrolyte solution contains, for example, a nonaqueous solvent and a solute (supporting electrolyte) dissolved in the nonaqueous solvent.

The supporting electrolyte is not particularly limited and may be a supporting electrolyte (for example, a lithium salt) for use in lithium secondary batteries.

The concentration of the supporting electrolyte in the electrolyte solution is not particularly limited and is, for example, 0.5 mol/L to 2 mol/L.

As the supporting electrolyte (lithium salt), for example, the following salts can be used: lithium salts of fluorine-containing acids (lithium hexafluorophosphate ($LiPF_6$), lithium tetrafluoroborate ($LiBF_4$), lithium trifluoromethanesulfonate ($LiCF_3SO_3$), and the like), lithium salts of chlorine-containing acids (lithium perchlorate ($LiClO_4$) and the like), lithium salts of fluorine-containing acid imides (lithium bis(trifluoromethylsulfonyl)imide ($LiN(CF_3SO_2)_2$), lithium bis(pentafluoroethylsulfonyl)imide ($LiN(C_2F_5SO_2)_2$), lithium bis(trifluoromethylsulfonyl)(pentafluoroethylsulfonyl)imide ($LiN(CF_3SO_2)(C_2F_5SO_2)$), and the like), lithium salts of fluorine-containing acid methides (lithium tris(trifluoromethylsulfonyl)methide ($LiC(CF_3SO_2)_3$) and the like), and the like. These supporting electrolytes may be used alone or in combination.

Examples of the nonaqueous solvent include cyclic carbonates (including derivatives (substituted compounds containing a substituent and the like)) such as propylene carbonate (PC), propylene carbonate derivatives, ethylene carbonate (EC), butylene carbonate, vinylene carbonate, and vinylethylene carbonate; linear carbonates such as dimethyl carbonate (DMC), diethyl carbonate (DEC), and ethyl methyl carbonate (EMC); linear ethers such as 1,2-dimethoxyethane, 1,2-diethoxyethane, trimethoxyethane, and ethyl monoglyme; cyclic ethers (including derivatives (substituted compounds containing a substituent and the like)) such as tetrahydrofuran, 2-methyltetrahydrofuran, tetrahydrofuran derivatives, dioxolane, and dioxolane derivatives; lactones such as γ-butyrolactone; amides such as formamide, N,N-dimethylformamide, and acetamide; nitriles such as acetonitrile and propylnitrile; nitroalkanes such as nitromethane; sulfoxides such as dimethyl sulfoxide; and sulfolane compounds such as sulfolane and methylsulfolane. These may be used alone or in combination.

The viscosity of the electrolyte solution is preferably 4.5 cP or less at 25° C. and more preferably 4.0 cP or less. When the viscosity of the electrolyte solution is preferably 4.5 cP or less, liquid return is good and deterioration is suppressed even in quick charge in which the electrolyte solution is likely to be short.

In general, as the supporting electrolyte is added at higher concentration, the viscosity of the electrolyte solution is higher. Thus, in order to reduce the viscosity of the electrolyte solution, the concentration of the supporting electrolyte may be reduced. When the concentration of the supporting electrolyte is low, lithium ions are unlikely to move and charge/discharge characteristics deteriorate. The viscosity can be reduced by increasing the proportion of a low-viscosity solvent such as a linear carbonate. However, increasing the proportion of the linear carbonate is likely to impair storage characteristics because of the generation of gas. From the viewpoint of obtaining sufficient charge/discharge characteristics and storage characteristics, the viscosity of the electrolyte solution is preferably 2.5 cP or more.

Thus, the viscosity of the electrolyte solution is preferably 2.5 cP to 4.5 cP or less at 25° C. and more preferably 2.5 cP to 4.0 cP.

The wound electrode group according to this embodiment is further described below in detail with reference to drawings.

Figure 1:
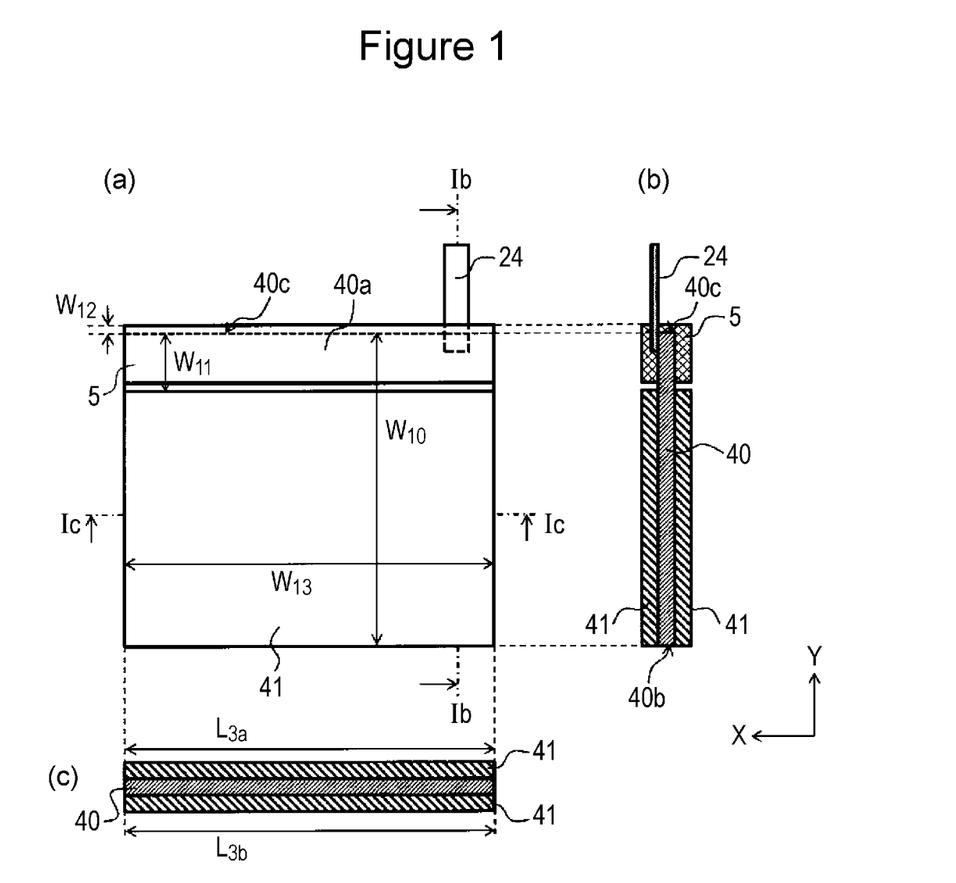
FIG. 1 includes a plan view (a) schematically showing an example of a positive electrode according to an embodiment of the present invention, a sectional view (b) taken along the line Ib-Ib, and a sectional view (c) taken along the line Ic-Ic.

FIG. 1 includes a plan view (a) schematically showing an example of the positive electrode, a sectional view (b) taken along the line Ib-Ib, and a sectional view (c) taken along the line Ic-Ic. A positive electrode 4 includes a positive electrode current collector 40 and positive electrode mix layers 41 placed on both surfaces of the positive electrode current collector 40. The positive electrode current collector 40 is rectangular. In this embodiment, a Y-direction in FIG. 1(a) coincides with a winding axis direction. An end section (hereinafter referred to as the first end section) of the positive electrode 4 in the Y-direction is provided with a first uncoated portion 40a where the positive electrode current collector 40 is exposed. The first uncoated portion 40a is narrowly placed along the first end section. The first uncoated portion 40a is connected to an end section of a strip-shaped positive electrode current-collecting lead 24.

The first uncoated portion 40a has a front surface and back surface covered by an insulating layer 5. The insulating layer 5 is narrowly placed along the first end section so as to cover an end surface 40c of the first end section. The insulating layer 5 protrudes slightly from the end surface 40c of the first end section by a width $W_{12}$ such that the end surface 40c of the first end section is covered by the insulating layer 5. This reduces the risk of internal short-circuiting due to the presence of the first uncoated portion 40a.

On the other hand, in another end section (hereinafter referred to as the second end section) of the positive electrode 4 in the Y-direction, the positive electrode current collector 40 is not exposed and the positive electrode mix layers 41 are placed over both surfaces thereof except an end surface 40b of the second end section. In both end sections of the positive electrode current collector 40 in an X-direction, both surfaces are entirely covered by the positive electrode mix layers 41 except an end surface in the X-direction and a portion corresponding to the first uncoated portion 40a. Incidentally, an "end surface" corresponds to a through-thickness cross section made by cutting a current collector.

The width $W_{10}$ of the positive electrode current collector 40 in the Y-direction may be selected depending on the length of the battery case or the battery capacity. The width $W_{11}$ of the first uncoated portion 40a in the Y-direction may be, for example, 1 mm to 4 mm. The width $W_{13}$ of the positive electrode current collector 40 in the X-direction may be selected depending on the diameter of the battery case or the battery capacity.

In FIG. 1(c), the positive electrode mix layers are placed on both surfaces of the positive electrode current collector and the lengths ($L3_a$ and $L3_b$) of the positive electrode mix layers 41 are equal ($L3_a=L3_b$). Thus, the entire length L3 of the positive electrode mix layers is given by $L3=L3_a+L3_b$. Incidentally, the lengths of the positive electrode mix layers 41 are equal to the width $W_{13}$ of the positive electrode current collector in the X-direction as shown in FIG. 1 and may be different therefrom. In particular, the lengths of the positive electrode mix layers 41 can be adjusted in such a manner that exposed portions are provided at an end section of the positive electrode current collector in the X-direction.

Figure 2:
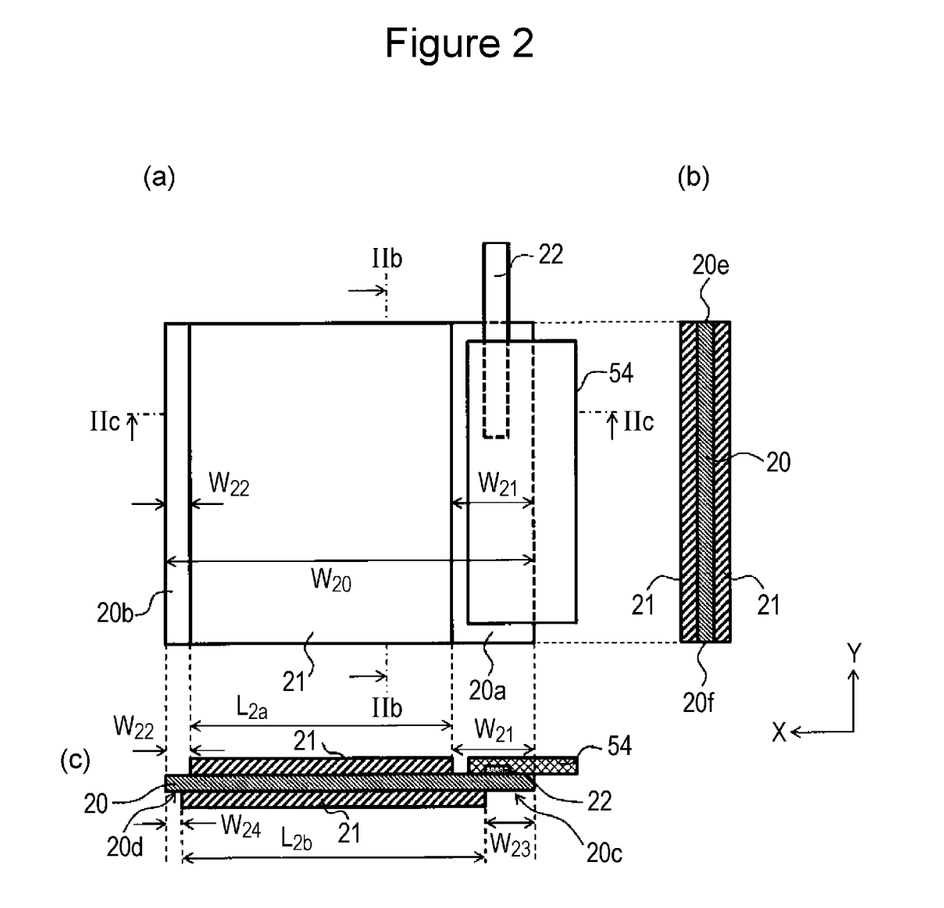
FIG. 2 includes a plan view (a) schematically showing an example of a negative electrode according to an embodiment of the present invention, a sectional view (b) taken along the line IIb-IIb, and a sectional view (c) taken along the line IIc-IIc.

FIG. 2 includes a plan view (a) schematically showing the negative electrode, a sectional view (b) taken along the line IIb-IIb, and a sectional view (c) taken along the line IIc-IIc. A negative electrode 2 includes a negative electrode current collector 20 and negative electrode mix layers 21 placed on both surfaces of the negative electrode current collector 20. The negative electrode current collector 20 is rectangular because the length thereof in the X-direction has been set larger than the positive electrode current collector 40. An end section (hereinafter referred to as the first end section) of the negative electrode current collector 20 in the X-direction is provided with a second uncoated portion 20a where the negative electrode current collector 20 is exposed. A principal surface opposite to the second uncoated portion 20a is provided with a fourth uncoated portion 20c where the negative electrode current collector 20 is exposed. The second uncoated portion 20a and the fourth uncoated portion 20c are narrowly placed along the first end section. The width $W_{21}$ of the second uncoated portion in the X-direction need not be equal to the width $W_{23}$ of the fourth uncoated portion in the X-direction. The second uncoated portion 20a is connected to an end section of a strip-shaped negative electrode current-collecting lead 22 by welding. A fixing insulating tape 54 is placed on the second uncoated portion 20a so as to cover a junction of the second uncoated portion 20a and the negative electrode current-collecting lead 22. The fixing insulating tape 54 fixes the outermost periphery of the wound electrode group.

Another end section (hereinafter referred to as the second end section) of the negative electrode current collector 20 in the X-direction is provided with a narrow third uncoated portion 20b and fifth uncoated portion 20d where the negative electrode current collector 20 is exposed. A principal surface opposite to the negative electrode current collector 20 is provided with the fifth uncoated portion 20d. The width $W_{22}$ of the third uncoated portion in the X-direction need not be equal to the width $W_{24}$ of the fifth uncoated portion in the X-direction. The third uncoated portion 20b and the fifth uncoated portion 20d are placed in an inner peripheral section of the wound electrode group.

The width $W_{21}$ of the second uncoated portion 20a in the X-direction and the width $W_{23}$ of the fourth uncoated portion 20c in the X-direction are, for example, 10% to 50% of the width $W_{20}$ of the negative electrode current collector 20 in the X-direction. The width $W_{22}$ of the third uncoated portion 20b in the X-direction and the width $W_{24}$ of the fifth uncoated portion 20d in the X-direction are, for example, 3% to 10% of the width $W_{20}$ thereof.

Both end sections of the negative electrode current collector 20 in the Y-direction are covered by the negative electrode mix layers 21 except end surfaces 20e and 20f thereof in the Y-direction and portions corresponding to the second uncoated portion 20a, the third uncoated portion 20b, the fourth uncoated portion 20c, and the fifth uncoated portion 20d.

In FIG. 2(c), the negative electrode mix layers 21 are placed on both surfaces of the negative electrode current collector 20 and the lengths thereof are $L2_a$ and $L2_b$. Thus, the entire length L2 of the negative electrode mix layers is given by $L2=L2_a+L2_b$.

Figure 3:
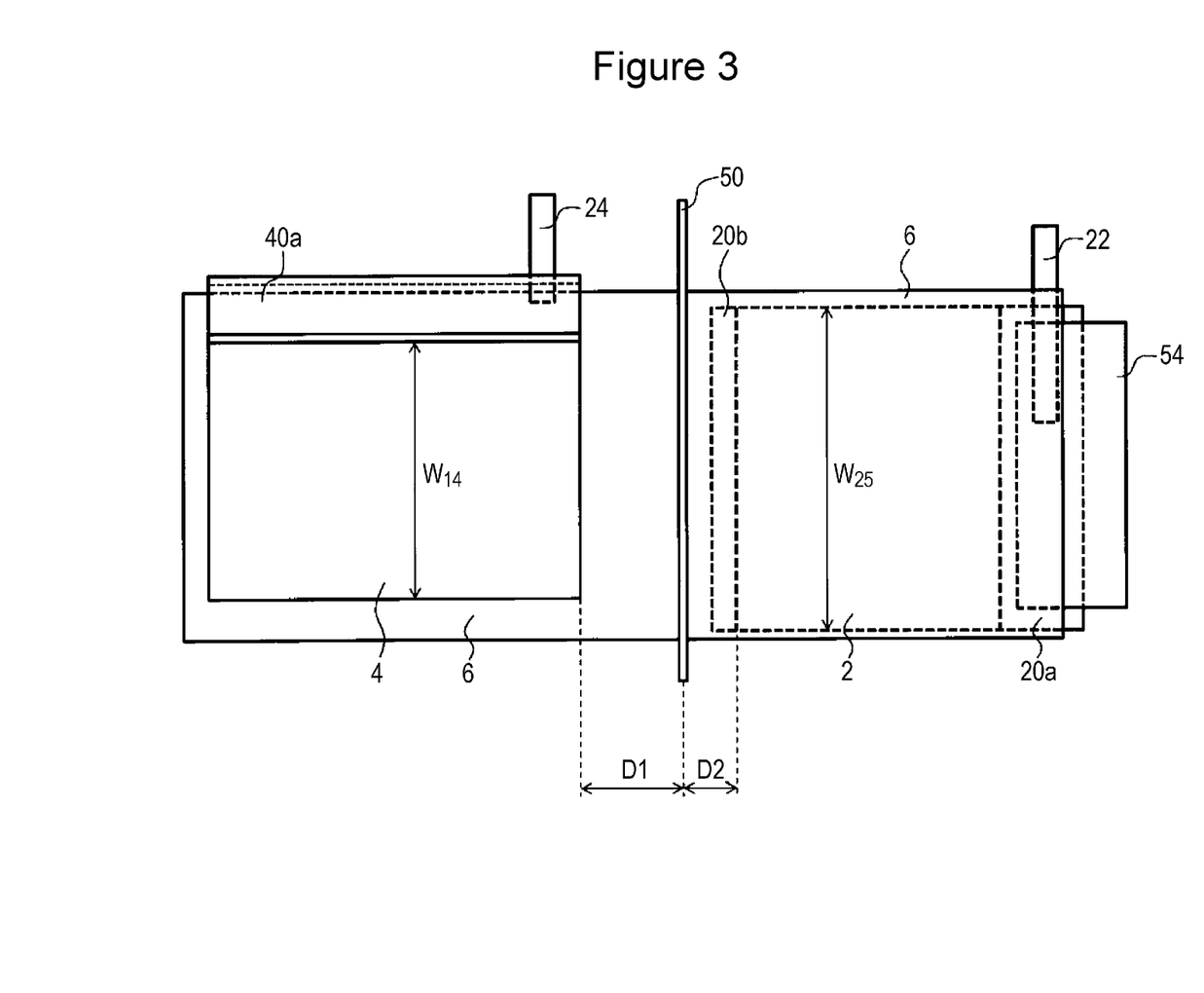
FIG. 3 is a plan view schematically showing the configuration of an unwound electrode group.

FIG. 3 is a plan view schematically showing the configuration of the unwound electrode group. In an illustrated example, a separator 6 is centered, the positive electrode 4 is placed on the left side and front surface side of the separator 6, and the negative electrode 2 is placed on the right side and back surface side of the separator 6. A stack of the positive electrode 4, separator 6, and negative electrode 2 placed as described above is wound around a core 50, whereby the electrode group is cylindrically formed. The width $W_{14}$ of the positive electrode mix layers 41 in the winding axis direction (Y-direction) is less than the width $W_{25}$ of the negative electrode mix layers 21 in the winding axis direction (Y-direction). When being wound, the positive electrode 4 and the negative electrode 2 are layered such that the positive electrode mix layers 41 completely overlap the negative electrode mix layers 21.

Both end sections of the separator 6 in the winding axis direction protrude from corresponding end sections of the negative electrode 2. This reduces the risk of internal short-circuiting.

The positive electrode 4 and the negative electrode 2 are apart from the core 50 and are placed on the separator 6. A stack shown in FIG. 3 is wound around the core 50 with the separator sandwiched, whereby the electrode group is formed.

An inner peripheral non-facing region can be formed in the inner peripheral section of the electrode group in such a manner that, for example, the space distance D1 between the axis of the core 50 and each of the positive electrode mix layers is set larger than the space distance D2 between the axis of the core 50 and a corresponding one of the negative electrode mix layers (D1>D2). In FIG. 3, D1-D2 gives substantially the length of the outer periphery side of the inner peripheral non-facing region. Incidentally, an inner peripheral non-facing region is also formed on a surface on the opposite side (inner periphery side).

In the cylindrical secondary battery according to this embodiment, a non-facing region is placed and the ratio L1/L2 of the entire length of the non-facing region to the entire length of the negative electrode mix layer is set to a predetermined value or more, thereby enabling the electrolyte solution to be ensured in the negative electrode mix layer of the non-facing region and liquid returning properties to be enhanced.

The ratio L1/L2 is preferably increased to 0.09 or more. This enables a large amount of liquid to be held in the non-facing region, which does not face the positive electrode mix layer, in the negative electrode mix layer; further enhances liquid returning properties; and suppresses drying-up. As a result, cycle characteristics can be enhanced. The entire length L1 of the non-facing region is given by $L1=L2-L3$.

The outermost periphery of the electrode group includes a region (the second uncoated portion 20a) where the negative electrode current collector 20 is exposed. The negative electrode current-collecting lead 22 is placed on the exposed negative electrode current collector 20. The fixing insulating tape 54 is placed so as to cover a junction of the negative electrode current-collecting lead 22 and the negative electrode current collector 20.

The inside diameter (diameter) of the hollow section of the electrode group, which has been cylindrically formed, is preferably 2.0 mm or less and may be 1.5 mm or less or 1 mm or less. Even when the inside diameter (diameter) of the hollow section is small as described above, the drying-up of the negative electrode 2 in the inner peripheral section of the electrode group can be suppressed. The inside diameter (diameter) of the hollow section may be 0.7 mm or more or 0.8 mm or more.

The outside diameter (diameter) of the electrode group is not particularly limited and may be 6 mm or less or 5 mm or less. The outside diameter (diameter) of the electrode group may be 1 mm or more or 2 mm or more. The diameter of the electrode group means the diameter of a circle corresponding to the outermost peripheral surface of the electrode group in a cross section perpendicular to the winding axis direction (that is, a circle having the same area as the area of the electrode group in a cross section).

In this embodiment, the following case has been exemplified: a case where the electrode group, which is cylindrical, is obtained in such a manner that the positive electrode 4 and the negative electrode 2 are placed on the single separator 6 and are wound such that a central portion of the separator 6 serves as an axis. The present invention is not limited to this. The electrode group may be obtained in such a manner that, for example, two separators each having the positive electrode 4 or the negative electrode 2 placed thereon are lapped and the lapped separators are wound from an end section.

The number of turns in the electrode group may be appropriately set in consideration of a desired capacity, the diameter of the electrode group, and the like. The number of turns in the electrode group may be, for example, three to ten or three to eight. When the number of turns is within such a range, high capacity is ensured and the electrolyte solution is likely to be inhibited from being squeezed toward an outer peripheral portion because the electrode group is not excessively squeezed. The number of turns is the number of laps in a portion where the positive electrode mix layers 41 and the negative electrode mix layers 21 are wound in such a state that the positive electrode mix layers 41 face the negative electrode mix layers 21.

Figure 4:
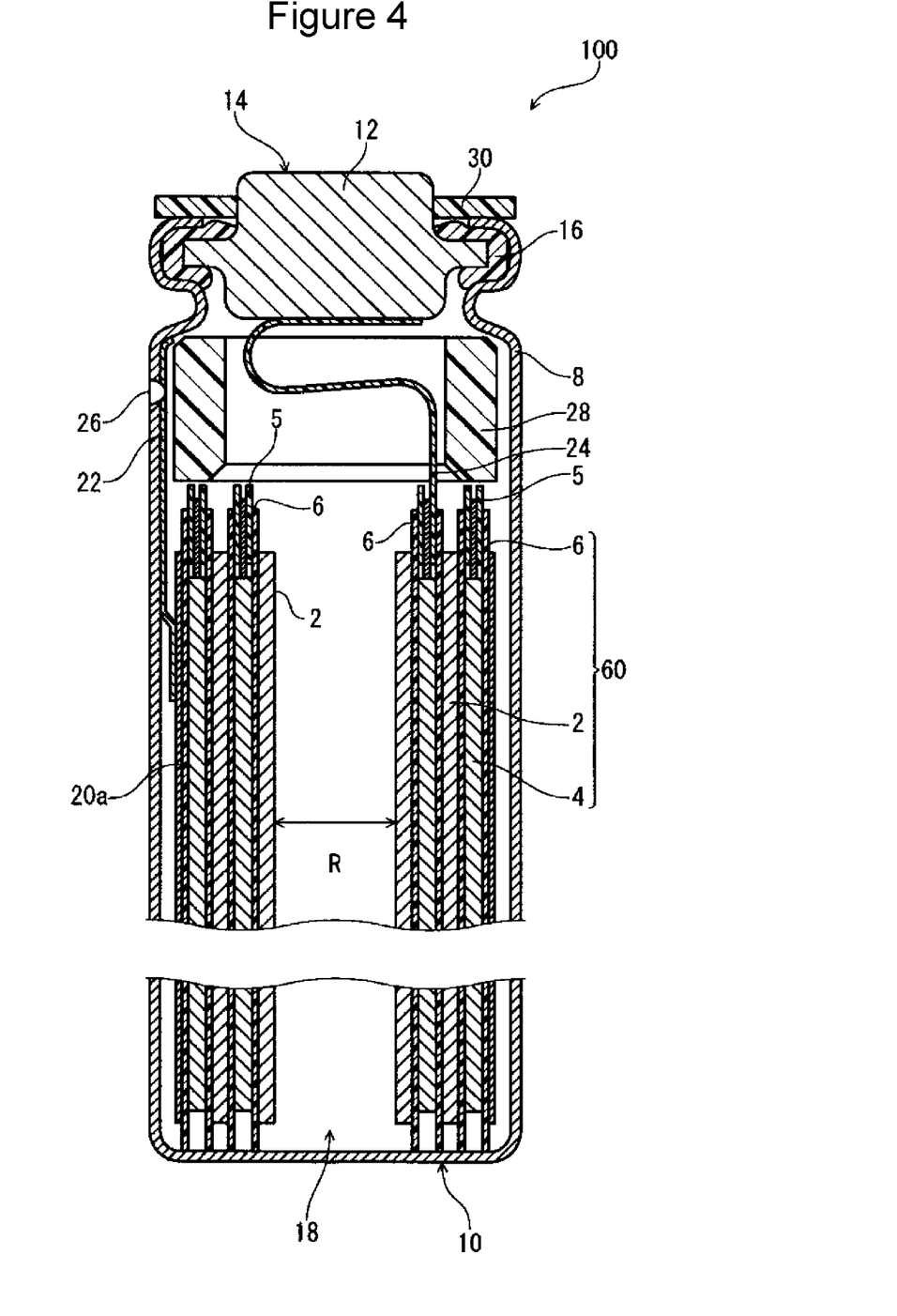
FIG. 4 is a vertical sectional view of a cylindrical secondary battery according to an embodiment of the present invention.

FIG. 4 is a schematic vertical sectional view of a cylindrical secondary battery according to an embodiment of the present invention. The positive electrode 4 and the negative electrode 2 are wound with the separator 6 therebetween to form an electrode group 60. The cylindrical secondary battery 100 includes a bottomed cylindrical battery case 8 having an opening; the wound electrode group 60, which is housed in the battery case 8; the electrolyte solution (not shown), which is housed in the battery case 8; and a sealing member 12 blocking the opening of the battery case 8. A hollow section 18 formed by removing the core 50 is placed in the vicinity of a winding axis of the electrode group. In FIG. 4, the separator 6 located on the innermost periphery is not shown.

An end section of the opening of the battery case 8 is swaged to a periphery of the sealing member 12 with a gasket 16 therebetween by bending the opening end section inward, whereby the battery case 8 is sealed. An insulating ring member 30 is placed on the periphery of the sealing member 12 so as to cover an outer surface of the bent opening end section of the battery case 8 and a surface of the gasket 16 therearound. This enables short-circuiting due to the electrical connection between the battery case 8 and the sealing member 12 to be prevented.

A space is present between an upper end surface (top surface) of the electrode group 60 and the bottom surface of the sealing member 12. An insulating cylinder 28 is placed in the space to restrict the contact of the electrode group 60 with the sealing member 12. The insulating cylinder 28 may be integrated with the gasket 16.

Both the negative electrode current-collecting lead 22 and the positive electrode current-collecting lead 24 are both are placed on the opening side of the battery case 8. That is, the positive electrode current-collecting lead 24 has an end section connected to the positive electrode 4 and another end section which is extended from an end surface of the electrode group that is on the opening side and which is connected to the inside of the sealing member 12. On the other hand, the negative electrode current-collecting lead 22 has an end section connected to the negative electrode 2 and another end section which is extended from the end surface of the electrode group that is on the opening side and which is connected to an inner surface of a side wall of the battery case 8 that is on the opening side by resistance welding. An outer surface of the bottom of the battery case 8 serves as a negative electrode terminal 10 and an outer surface of the sealing member 12 serves as a positive electrode terminal 14. In FIG. 4, the fixing insulating tape 54 is omitted.

Since the negative electrode current-collecting lead 22 is welded to the inner surface of the side wall of the battery case 8, the length of a protrusion of the negative electrode current-collecting lead 22 that protrudes from an end surface of the electrode group may be small. Therefore, the negative electrode current-collecting lead 22 is housed in the battery case 8 such that the negative electrode current-collecting lead 22 is hardly bent and is sandwiched between the electrode group and the side wall of the battery case 8.

After the negative electrode current-collecting lead 22 is welded to the battery case, the insulating cylinder 28 is provided in a space on the opening side of the battery case 8. Incidentally, the positive electrode current-collecting lead 24 is routed to an inner surface of the sealing member 12 through a hollow section of the insulating cylinder 28.

In the negative electrode 2, the two negative electrode mix layers 21 are placed on both principal surfaces of the negative electrode current collector layer 20 (not shown). Among the negative electrode mix layers 21 of the negative electrode 2, which is located in the inner peripheral section of the electrode group, a portion of the negative electrode mix layer that is located on the inner periphery side of the negative electrode current collector layer 20 does not face the positive electrode 4 and forms a non-facing region. Furthermore, among the negative electrode mix layers 21 of the negative electrode 2, which is located in the inner peripheral section thereof, a portion of the negative electrode mix layer that is located on the outer periphery side of the negative electrode current collector layer 20 does not face the positive electrode 4 and forms a non-facing region.

Since the non-facing regions, where the negative electrode mix layers do not face the positive electrode mix layers, are placed in the inner peripheral section, a necessary and sufficient amount of the electrolyte solution can be ensured in the inner peripheral section of the electrode group and the depletion of the electrolyte solution can be reduced. Even in a case where charge and discharge associated with quick charge are repeated, cycle characteristics are enhanced.

The negative electrode current collector 20 (second uncoated portion 20a) is exposed on the outermost periphery side of the electrode group 60. The second uncoated portion 20a faces an inside wall of the battery case 8. The second uncoated portion 20a is connected to one end section of the negative electrode current-collecting lead 22. The other end section of the negative electrode current-collecting lead 22 is connected to the inside wall of the battery case 8 at a weld 26. The weld 26 is placed on, for example, an inside wall of the battery case 8 that is closer to the opening side than an upper end surface of the electrode group 60.

The outside diameter of the cylindrical secondary battery 100 is not particularly limited and may be 6.5 mm or less or 5 mm or less. The outside diameter of the cylindrical secondary battery 100 may be 1 mm or more, 2 mm or more, or 3 mm or more. The outside diameter of the cylindrical secondary battery 100 is the maximum diameter of the bottom of the battery case 8, which is described below. The cylindrical secondary battery according to this embodiment is suitable for a battery with an outside diameter of 3.0 mm to 6.5 mm.

(Battery Case)

The battery case 8 has the opening and a bottomed cylindrical shape. The thickness (maximum thickness) of the bottom of the battery case 8 is 0.08 mm to 0.2 mm and is preferably 0.09 mm to 0.15 mm. The thickness (maximum thickness) of a side wall of the battery case 8 is 0.08 mm to 0.2 mm and is preferably 0.08 mm to 0.15 mm. Incidentally, these thicknesses are the thicknesses of the bottom and side wall of the battery case 8 in the assembled cylindrical secondary battery 100.

The battery case 8 is, for example, a metal can. As material making up the battery case 8, aluminum, an aluminum alloy (an alloy containing a minute amount of another metal such as manganese or copper or the like), iron, an iron alloy (including stainless steel), and/or the like can be exemplified. The battery case 8 may be a plated one (for example, a nickel-plated one or the like) as required.

(Sealing Member)

The shape of the sealing member 12 is not particularly limited. A disk shape, a shape in which a central portion of a disk protrudes in a thickness direction (a hat shape), and the like can be exemplified. As material making up the sealing member 12, aluminum, an aluminum alloy (an alloy containing a minute amount of another metal such as manganese or copper or the like), iron, an iron alloy (including stainless steel), and the like can be exemplified.

(Current-Collecting Leads)

As material of the positive electrode current-collecting lead 24, for example, metal such as aluminum, titanium, or nickel; an alloy thereof; or the like is cited. As material of the negative electrode current-collecting lead 22, for example, metal such as copper or nickel, an alloy thereof, or the like is cited.

The shape of current-collecting leads is not particularly limited and may be, for example, a wire shape or a sheet shape (or a ribbon shape). The width and/or thickness of a current-collecting lead connected to the inside wall of the battery case 8 may be appropriately determined from the viewpoint of ensuring the ease of inserting the electrode group 60 into the battery case 8 and/or the strength of the current-collecting lead and/or the viewpoint of reducing the volume occupied by the current-collecting lead in the battery case 8. The width of a ribbon-shaped current-collecting lead is preferably 1 mm to 2 mm and more preferably 1 mm to 1.5 mm from the viewpoint of ensuring a certain degree of welding strength and the viewpoint of space saving. The thickness of the current-collecting leads is preferably 0.05 mm to 0.15 mm and more preferably 0.05 mm to 0.1 mm from the viewpoint of the strength of the current-collecting leads and the viewpoint of the ease of inserting the electrode group 60.

The present invention is described below in detail with reference to examples and comparative examples. The present invention is not limited to the examples below.

<Battery A1>

In accordance with a procedure below, a cylindrical secondary battery was prepared as shown in FIG. 4.

(1) Preparation of Positive Electrode

NMP serving as a dispersion medium was added to 100 parts by mass of lithium cobaltate serving as a positive electrode active material, four parts by mass of acetylene black serving as a conductive agent, and four parts by mass of PVdF serving as a binding agent, followed by mixing, whereby positive electrode slurry was prepared. The positive electrode slurry was applied to both surfaces of aluminum foil (a thickness of 13 μm) serving as a positive electrode current collector and was dried, followed by compressing in a thickness direction, whereby a positive electrode 4 (a thickness of 0.08 mm) was prepared. A region (a first uncoated portion 40a) having no positive electrode mix layers 41 was provided in the positive electrode 4 in preparation and one end section of a ribbon-shaped positive electrode lead 24 (a width of 1.0 mm and a thickness of 0.1 mm) was connected to the first uncoated portion 40a. The positive electrode 4 was cut so as to have a width $W_{13}$ of 50.5 mm in an X-direction. Thus, the lengths ($L3_a$ and $L3_b$) of the positive electrode mix layers were both 50.5 mm and the entire length L3 of the positive electrode mix layers was 101.0 mm.

(2) Preparation of Negative Electrode

A mixture obtained by mixing 100 parts by mass of a synthetic graphite powder serving as a negative electrode active material, one part by mass of styrene butadiene rubber (SBR) serving as a binding agent, and one part by mass of CMC serving as a thickening agent together was dispersed in deionized water, whereby nonaqueous electrolyte slurry was prepared. The negative electrode slurry was applied to both surfaces of copper foil (a thickness of 6 μm) serving as a negative electrode current collector and was dried, followed by compressing in a thickness direction, whereby a negative electrode 2 (a thickness of 0.11 mm) was prepared. The prepared negative electrode 2 was cut to a predetermined size and was measured for weight. The density of compressed negative electrode mix layers was determined in such a manner that a value obtained by subtracting the weight of the negative electrode current collector from the weight of the negative electrode 2 was divided by the volume of negative electrode mix layer portions, resulting in that the density thereof was evaluated at 1.35 g/cm³. The negative electrode mix can be adjusted depending on the degree of rolling after application.

Regions (a second uncoated portion 20a, a third uncoated portion 20b, a fourth uncoated portion 20c, and a fifth uncoated portion 20d) having no negative electrode mix layers 21 were provided in the negative electrode 2 in preparation. One end section of a ribbon-shaped negative electrode current-collecting lead 22 (a width of 1.5 mm and a thickness of 0.05 mm) was connected to the second uncoated portion 20a. The negative electrode was cut so as to have a width $W_{20}$ of 80.0 mm in the X-direction. In this state, the thicknesses L2a and L2b of the negative electrode mix layers were 50.8 mm and 64.1 mm, respectively, and the entire length L2 of the negative electrode mix layers was 114.9 mm.

(3) Preparation of Electrode Group

A separator 6 composed of a microporous membrane (a thickness of 14 μm) made of polyethylene was inserted into a slit portion formed in a core 50 (a columnar shape with a diameter of 1.2 mm). Next, the separator 6, the positive electrode 4, and the negative electrode 2 were arranged as shown in FIG. 4. In this state, the positive electrode 4, the negative electrode 2, and the separator 6 were wound around the core 50, whereby an electrode group 60 was formed. The core was removed by slightly relaxing winding and a fixing insulating tape 54 was attached to a winding end, whereby the electrode group 60 was fixed. The number of turns in the electrode group 60 was set to four to six.

The space distances D1 and D2 were 5.8 mm and 4.0 mm, respectively, when the positive electrode 4, the negative electrode 2, and the separator 6 were arranged. Since the entire length L2 of the negative electrode mix layers was 114.9 mm and the entire length L3 of the positive electrode mix layers was 101.0 mm, the entire length L1 of a non-facing region was 13.9 mm and the ratio L1/L2 of the entire length of the non-facing region to the entire length of the negative electrode mix layers was determined to be 0.12. The ratio $L1_{in}/L2$ of the entire length of an inner peripheral non-facing region to the entire length of the negative electrode mix layers was 0.07.

(4) Preparation of Electrolyte Solution

An electrolyte solution was prepared by dissolving $LiPF_6$ in a solvent mixture containing EC and EMC at a mass ratio of 1:2. In this operation, the concentration of $LiPF_6$ in the electrolyte solution was set to 1.0 mol/L.

The viscosity of the electrolyte solution was measured with a rotary viscometer and was found to be 4.0 cP at 25° C.

(5) Preparation of Cylindrical Lithium Ion Secondary Battery

The electrode group 60, which was obtained in (3), was inserted into a bottomed cylindrical battery case 8 (an outside diameter of 4.6 mm), formed from a nickel-plated iron plate, having an opening. Another end section of the negative electrode current-collecting lead 22 was connected to an inside wall of the battery case 8 at a weld 26 by welding. The weld 26 was located closer to the opening of the battery case 8 than an upper end surface of the electrode group 60. An insulating cylinder 28 was provided on an upper portion of the electrode group 60. Another end section of the positive electrode current-collecting lead 24 that was extended from the electrode group 60 was routed through a hole in the insulating cylinder 28 and was connected to the bottom surface of a sealing member 12. In this operation, a ring-shaped insulating gasket 16 was mounted on a peripheral portion of the sealing member 12.

Into the battery case 8, 146 µL (2.9 µL per a discharge capacity of 1 mAh) of the electrolyte solution, which was prepared in (4), was poured. The sealing member 12, which was nickel-plated and was made of iron, was provided on the opening of the battery case 8 and an end section of the opening of the battery case 8 was swaged to the peripheral portion of the sealing member 12 with the gasket 16 therebetween, whereby the battery case 8 was sealed. Butyl rubber-based insulating paint was applied in a doughnut pattern so as to cover an outer surface of the opening end section of the battery case 8 and a surface of the gasket 16 therearound, whereby a ring member 30 was formed.

In this manner, a cylindrical lithium ion secondary battery (Battery A1) with a nominal capacity of 50.0 mAh was obtained. The outside diameter (diameter) of the electrode group 60 was about 4.5 mm. The inside diameter (diameter) of a hollow section of the electrode group 60 was about 1.2 mm.

<Batteries A2 to A6>

Cylindrical secondary batteries were prepared by substantially the same method as that used to prepare Battery A1 except that the density of a negative electrode mix and the ratio L1/L2 of the length of a non-facing region were changed as shown in Table 1, whereby Batteries A2 to A6 were obtained.

<Batteries A7 to A10>

Cylindrical secondary batteries were prepared by substantially the same method as that used to prepare Battery A1 except that the thickness of positive electrode mix layers and the thickness of the negative electrode mix layers were changed as shown in Table 1, whereby Batteries A7 to A10 were obtained.

<Batteries A11 to A13>

Cylindrical secondary batteries were prepared by substantially the same method as that used to prepare Battery A1 except that the viscosity of an electrolyte solution was adjusted by changing the ratio between solvents in the electrolyte solution as shown in Table 3, whereby Batteries A11 to A13 were obtained. In Battery A11, EC and DEC were mixed at a mass ratio of 1:2; in Battery A12, EC, EMC, and DMC were mixed at a mass ratio of 1:1:1; and in Battery A13, EC and DMC were mixed at a mass ratio of 1:2, whereby electrolyte solutions were obtained.

Table 1 shows the density ($g/cm^3$) of the negative electrode mix of Batteries A1 to A10, L1/L2, the thickness (µm) of the positive electrode mix layers, the thickness (µm) of the negative electrode mix layers, the sum (µm) of the thicknesses of the positive and negative electrode mix layers, and the ratio of the thickness of a positive electrode mix layer to the thickness of a negative electrode mix layer. Table 3 shows the value of the viscosity (cP) of the electrolyte solution in each of Batteries A1 and A11 to A13.

TABLE 1

|  | Density of negative electrode mix layers ($g/cm^3$) | L1/L2 | Thickness of positive electrode mix layers (µm) | Thickness of negative electrode mix layers (µm) | Sum of thicknesses of positive and negative electrode mix layers (µm) | Thicknesses of positive electrode mix layer/thickness of negative electrode mix layer |
|---|---|---|---|---|---|---|
| A1 | 1.35 | 0.12 | 34.0 | 51.5 | 85.5 | 0.66 |
| A2 | 1.25 | 0.09 | 34.0 | 55.5 | 89.5 | 0.61 |
| A3 | 1.43 | 0.11 | 34.0 | 48.5 | 82.5 | 0.70 |
| A4 | 1.49 | 0.11 | 34.0 | 46.5 | 80.5 | 0.73 |
| A5 | 1.20 | 0.12 | 34.0 | 58.0 | 92.0 | 0.59 |
| A6 | 1.43 | 0.05 | 34.0 | 48.5 | 82.5 | 0.70 |
| A7 | 1.35 | 0.12 | 47.5 | 52.5 | 100.0 | 0.90 |
| A8 | 1.35 | 0.12 | 26.0 | 48.5 | 74.5 | 0.60 |
| A9 | 1.35 | 0.12 | 38.5 | 66.5 | 105.0 | 0.58 |
| A10 | 1.35 | 0.12 | 47.0 | 50.5 | 97.5 | 0.93 |

[Evaluation]

(1) Cycle Characteristics

Three batteries prepared in each example of Batteries A1 to A 13 were measured for initial discharge capacity by a procedure below.

After each battery was charged at a constant current of 3 C until the closed-circuit voltage of the battery reached 4.35 V, 4.35 V was maintained and the charge thereof was stopped at the point in time when a current of 0.05 C was observed. Thereafter, the battery was discharged at a constant current of 1 C until the closed-circuit voltage of the battery reached 3 V. In the charge and discharge, the discharge voltage during discharge was monitored, the discharge capacity was determined, and the average of the three batteries was calculated. The obtained average was set to initial discharge capacity. The charge and discharge were performed in a 20° C. environment.

The above charge and discharge were repeated 300 times in total, the discharge capacity at the 300th discharge was determined from the discharge voltage in accordance with the above, and the average of the three batteries was calculated. The ratio of the obtained average to the initial discharge capacity was calculated and was set to capacity retention (%).

Table 2 shows measurement results of the capacity retention of Batteries A1 to A13.

(2) High-Temperature Storage Characteristics

Batteries A1 and A11 to A13 were measured for capacity recovery after storage by a procedure below. First, the discharge capacity was measured by the method described in the above (1). Thereafter, after each battery was charged at a constant current of 3 C until the closed-circuit voltage of the battery reached 4.35 V, 4.35 V was maintained and the charge thereof was stopped at the point in time when a current of 0.05 C was observed. In this state, the battery was kept in a 60° C. thermostatic chamber. After 20 days elapsed, the charge and discharge described in (1) were performed for two cycles and the second cycle discharge capacity was determined.

The ratio of the second cycle discharge capacity of the battery after storage to the discharge capacity of the battery before storage testing was determined and the capacity recovery was evaluated. Table 3 shows measurement results of the capacity recovery of Batteries A1 and A11 to A13 together with the viscosity [cP] of each electrolyte solution.

TABLE 2

| | Capacity retention (%) |
|---|---|
| A1 | 82 |
| A2 | 82 |
| A3 | 75 |
| A4 | 63 |
| A5 | — |
| A6 | 67 |
| A7 | 77 |
| A8 | 87 |
| A9 | 71 |
| A10 | 74 |
| A11 | 75 |
| A12 | 84 |
| A13 | 85 |

TABLE 3

| | Viscosity [cP] | Capacity recovery (%) |
|---|---|---|
| A1 | 4.0 | 87 |
| A11 | 4.5 | 87 |
| A12 | 2.4 | 84 |
| A13 | 2.5 | 80 |

As shown in Table 2, in Batteries A1 to A3 and A7 to A13, a high capacity retention of more than 70% was obtained and high charge-discharge cycle characteristics were exhibited after 300 cycles of charge and discharge. This is probably because, since the density of the negative electrode mix and L1/L2 were within an appropriate range, an electrolyte solution squeezed out of a negative electrode mix layer could immediately return into the negative electrode mix layer and therefore a charge-discharge reaction proceeded homogeneously.

In Battery A4, the capacity recovery after 300 cycles of charge and discharge decreased to less than 70%. This is probably because, since the density of the negative electrode mix layers was high, the liquid absorbency of the electrolyte solution decreased and drying-up occurred in the negative electrode mix layers. On the other hand, in Battery A5, the density of the negative electrode mix layers was too low and therefore the negative electrode mix layers fell from the negative electrode current collector in the preparation of the electrode group. This shows that when the density of a negative electrode mix layer is too low, it is difficult to ensure the adhesion between the negative electrode mix layer and a negative electrode current collector.

In Battery A6, the capacity recovery also decreased. This is probably because, since the ratio L1/L2 of the length of the non-facing regions was small, liquid return was insufficient and heterogeneous reactions occurred because the amount of the electrolyte solution capable of being held in portions of the negative electrode mix layers that did not face the positive electrode was small.

From Batteries A7 to A10, it is shown that suppressing the sum of the thicknesses of a positive electrode mix layer and a negative electrode mix layer to 100 μm or less and setting the ratio of the thickness of the positive electrode mix layer to the thickness of the negative electrode mix layer to 0.6 to 0.9 allows a high capacity retention of 75% or more to be maintained even after 300 cycles.

From Batteries A11 to A13, a high capacity retention of 75% or more was obtained after 300 cycles when the viscosity of an electrolyte solution was 4.5 cP or less at 20° C. This is probably because reducing the viscosity of an electrolyte solution reduces the movement resistance of the electrolyte solution in a negative electrode mix layer to enhance liquid returning properties. On the other hand, as is clear from Table 3, as the viscosity of an electrolyte solution is lower, the capacity recovery after storage is lower. This is probably caused by the fact that using a low-viscosity solvent increases the amount of generated gas. Table 3 suggests that when the viscosity of an electrolyte solution is less than 2.5 cP, the capacity recovery after storage at 60° C. for 20 days is less than 80%. Therefore, the viscosity of an electrolyte solution is preferably 2.5 cP or more.

INDUSTRIAL APPLICABILITY

A cylindrical secondary battery according to an embodiment of the present invention is compact and lightweight and has particularly excellent cycle characteristics in charge and discharge associated with quick charge. Therefore, the cylindrical secondary battery can be successfully used as a power supply for various electronic devices, particularly for various portable electronic devices (including glasses (such as 3D glasses), hearing aids, stylus pens, wearable terminals, and the like) requiring a compact power supply.

REFERENCE SIGNS LIST

2 Negative electrode
4 Positive electrode
5 Insulating layer
6 Separator
8 Battery case
10 Negative electrode terminal
12 Sealing member
14 Positive electrode terminal
16 Gasket
18 Hollow section
20 Negative electrode current collector
20a Second uncoated portion
20b Third uncoated portion
20c Fourth uncoated portion
20d Fifth uncoated portion 20e, 20f End surface
21 Negative electrode mix layers
22 Negative electrode current-collecting lead
24 Positive electrode current-collecting lead
26 Weld
28 Insulating cylinder
30 Ring member
40 Positive electrode current collector
40a First uncoated portion
40b End surface of second end section
40c End surface of first end section
41 Positive electrode mix layers
50 Core
54 Fixing insulating tape
60 Electrode group
100 Cylindrical secondary battery

The invention claimed is:

1. A cylindrical secondary battery comprising:
a bottomed cylindrical battery case having an opening;
an electrode group housed in the battery case;
an electrolyte solution housed in the battery case; and
a sealing member blocking the opening of the battery case,
wherein the electrode group includes a positive electrode, a negative electrode, and a separator placed between the positive electrode and the negative electrode and is formed in such a manner that the positive electrode and the negative electrode are wound with the separator therebetween,
the positive electrode includes a positive electrode current collector having a first principal surface and a second principal surface facing the first principal surface and a positive electrode mix layer placed on at least one of the first principal surface or the second principal surface of the positive electrode current collector,
the negative electrode includes a negative electrode current collector having a first principal surface and a second principal surface facing the first principal surface and a negative electrode mix layer placed on at least one of the first principal surface or the second principal surface of the negative electrode current collector,
the negative electrode mix layer includes a non-facing region not facing the positive electrode mix layer,
a density of the negative electrode mix layer is 1.25 g/cm$^3$ to 1.43 g/cm$^3$,
a ratio of an entire length L1 of the non-facing region to an entire length of the negative electrode mix layer L2 is 0.09 or more, and
an inside diameter of a hollow section of the electrode group is 2.0 mm or less.

2. The cylindrical secondary battery according to claim 1, wherein:
a sum of a thickness of the positive electrode mix layer and a thickness of the negative electrode mix layer is 100 μm or less, and
a ratio of the thickness of the positive electrode mix layer to the thickness of the negative electrode mix layer is from 0.6 to 0.9.

3. The cylindrical secondary battery according to claim 1, wherein an outside diameter of the battery case is 3.0 mm to 6.5 mm.

4. The cylindrical secondary battery according to claim 1, wherein a viscosity of the electrolyte solution is 4.5 cP or less at 25° C.

5. The cylindrical secondary battery according to claim 1, wherein the negative electrode current collector is exposed at an outermost periphery of the electrode group.

6. The cylindrical secondary battery according to claim 1, wherein:
the negative electrode mix layer is placed on both of the first and second principal surfaces of the negative electrode current collector,
the positive electrode mix layer is placed on both of the first and second principal surfaces of the positive electrode current collector,
the entire length of the negative electrode mix layer L2 equals to L2a+L2b, where L2a is an entire length of the negative electrode mix layer in the first principal surface and L2b is an entire length of the negative electrode mix layer in the second principal surface,
an entire length of the positive electrode mix layer L3 equals to L3a+L3b, where L3a is an entire length of the positive electrode mix layer in the first principal surface and L3b is an entire length of the positive electrode mix layer in the second principal surface, and
L1 equals to L2-L3.

7. The cylindrical secondary battery according to claim 6, wherein:
the first principal surface includes one or more uncoated portions on which no negative electrode mix layer is formed, and
the second principal surface includes one or more uncoated portions on which no negative electrode mix layer is formed.

8. The cylindrical secondary battery according to claim 7, wherein an entire length of the one or more uncoated portions of the first principal surface is different from an entire length of the one or more uncoated portions of the second principal surface.

9. The cylindrical secondary battery according to claim 8, wherein:
the one or more uncoated portions of the first principal surface include a first uncoated portion and a second uncoated portion,
the one or more uncoated portions of the second principal surface include a third uncoated portion and a fourth uncoated portion, and
the first uncoated portion faces the third uncoated portion, and the second uncoated portion faces the fourth uncoated portion.

10. The cylindrical secondary battery according to claim 9, wherein:
a length of the first uncoated portion is different from a length of the second uncoated portion, and
a length of the third uncoated portion is different from a length of the fourth uncoated portion.

* * * * *